United States Patent
Cervantes

(10) Patent No.: US 8,964,748 B2
(45) Date of Patent: Feb. 24, 2015

(54) METHODS, SYSTEMS, AND COMPUTER READABLE MEDIA FOR PERFORMING FLOW COMPILATION PACKET PROCESSING

(75) Inventor: James H. Cervantes, Lexington, MA (US)

(73) Assignee: Genband US LLC, Plano, TX (US)

( * ) Notice: Subject to any disclaimer, the term of this patent is extended or adjusted under 35 U.S.C. 154(b) by 634 days.

(21) Appl. No.: 12/475,450

(22) Filed: May 29, 2009

(65) Prior Publication Data

US 2010/0265949 A1 Oct. 21, 2010

Related U.S. Application Data

(60) Provisional application No. 61/170,454, filed on Apr. 17, 2009.

(51) Int. Cl.
*H04L 12/56* (2006.01)
*H04L 12/801* (2013.01)
*H04L 12/851* (2013.01)

(52) U.S. Cl.
CPC ............ *H04L 47/10* (2013.01); *H04L 47/2483* (2013.01)
USPC ......................................... 370/392

(58) Field of Classification Search
CPC ................................... H04L 47/2441
USPC ................................ 370/392, 389; 709/226
See application file for complete search history.

(56) References Cited

U.S. PATENT DOCUMENTS

| 6,650,640 | B1 * | 11/2003 | Muller et al. | ................. 370/392 |
| 7,343,413 | B2 * | 3/2008 | Gilde et al. | .................. 709/226 |
| 2004/0158710 | A1 | 8/2004 | Buer et al. | |
| 2006/0221966 | A1 | 10/2006 | Basso et al. | |
| 2006/0268876 | A1 | 11/2006 | Grah | |
| 2008/0133518 | A1 | 6/2008 | Kapoor et al. | |
| 2012/0158397 | A1 * | 6/2012 | Nohl et al. | ...................... 703/26 |

OTHER PUBLICATIONS

Notification of Transmittal of the International Search Report and the Written Opinion of the International Searching Authority, or the Declaration for International Application No. PCT/US2010/031599 (Nov. 26, 2010).

* cited by examiner

*Primary Examiner* — Dang Ton
*Assistant Examiner* — Kevin Lee
(74) *Attorney, Agent, or Firm* — Jenkins, Wilson, Taylor & Hunt, P.A.

(57) ABSTRACT

Methods, systems, and computer readable media for performing flow compilation packet processing are disclosed. In one embodiment, the method includes receiving a packet at a packet processing device and determining if the packet is associated with a packet flow previously processed at the packet processing device. If the received packet is determined to be associated with the packet flow, at least one database containing compiled flow programs is queried to locate a compiled flow program previously used to process the packet flow. The method also includes utilizing the located compiled flow program to process the received packet.

16 Claims, 3 Drawing Sheets

METHODS, SYSTEMS, AND COMPUTER READABLE MEDIA FOR PERFORMING FLOW COMPILATION PACKET PROCESSING

PRIORITY CLAIM

This application claims the benefit of U.S. Provisional Patent Application No. 61/170,454, filed on Apr. 17, 2009, the disclosure of which is incorporated herein by reference in its entirety.

TECHNICAL FIELD

The subject matter described herein relates to packet processing devices and enhancing the application of services to packets in a recognized packet flow. More specifically, the subject matter relates to methods, systems, and computer readable media for performing flow compilation packet processing.

BACKGROUND

In computer networks, packet processing is a common function that can be performed by many types of network elements and devices. Typically, packet processing is conducted at a network element, which inspects or analyzes an incoming packet before performing at least one packet processing operation on the received packet. The network element may utilize packet header information to determine the origin of the packet, the destination of the packet, the port on which the packet was received, and the types of protocols associated with the packet. Based on the information obtained from each packet, the network element may determine the types of processing to be applied to the packet. For example, a network element may execute algorithms that extract and utilize packet header information to query databases in order to determine the type of packet processing operation to apply to the received packet.

Problems arise, however, if a significant number of databases are continuously queried by a network element after receiving each incoming packet (i.e., per-packet processing). Specifically, as the number of policy databases is being increased and the databases are being repeatedly searched after the receipt of each incoming packet, the packet processing resources associated with these networks are significantly strained. Consequently, advanced packet processing techniques, such as flow acceleration, may be employed by network operators to improve the speed and efficiency of a network element's ability to process a group of related packets (i.e., per-flow processing). Flow acceleration involves a packet processing procedure that eliminates the need for repeated database searches in the event a packet associated with a previously processed packet flow (e.g., a group of packets containing similar header data) is received.

If the network element determines that after inspection a received packet is related to a previously processed packet (i.e., the received packet is part of a common packet flow), then the packet header data may be used to consult one or more packet processing databases. A packet processing database includes a plurality of indices that directly "point" to entries in a policy database. The policy database entries contain packet processing operations and activities which may be applied to a received packet to be processed. Notably, by using the aforementioned flow acceleration technique to reference a packet processing database to acquire an index (i.e., that directly points to an entry in a policy database), the need for searching the numerous policy databases themselves is eliminated.

Although flow acceleration enables a network element to perform packet processing with greater efficiency since the policy databases do not have to be fully searched each time a packet is received, flow acceleration still requires that the appropriate policy database be accessed. Thus, packet processing efficiency could be improved even further if this step was eliminated.

Accordingly, a need exists for improved methods, systems, and computer readable media for performing flow compilation packet processing.

SUMMARY

Methods, systems, and computer readable media for performing flow compilation packet processing are disclosed. One exemplary method includes receiving a packet at a packet processing device and determining if the packet is associated with a packet flow previously processed at the packet processing device. If the received packet is determined to be associated with the packet flow, at least one database containing compiled flow programs is queried to locate a compiled flow program previously used to process the packet flow. The method also includes utilizing the located compiled flow program to process the received packet.

The subject matter described herein for performing flow compilation packet processing may be implemented using a computer readable medium having stored thereon executable instructions that when executed by the processor of a computer control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for performing flow compilation packet processing described herein. In addition, a computer readable medium that implements the subject matter described herein may be located on a single device or computing platform or may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

The present subject matter is related to performing a flow compilation packet processing technique that enhances the performance of other packet processing techniques by utilizing compiled per-flow packet processing programs cached in a dedicated database. These programs may be executed directly during the processing of a packet without the need to search or consult conventional packet processing databases. Although the following description describes the present subject matter within the context of a security gateway and associated packet networks, it is understood that the present subject matter may be applied to any type of system or device that is configured to process packets or any other type of datagram, such as cells, frames, and the like.

Figure 1:
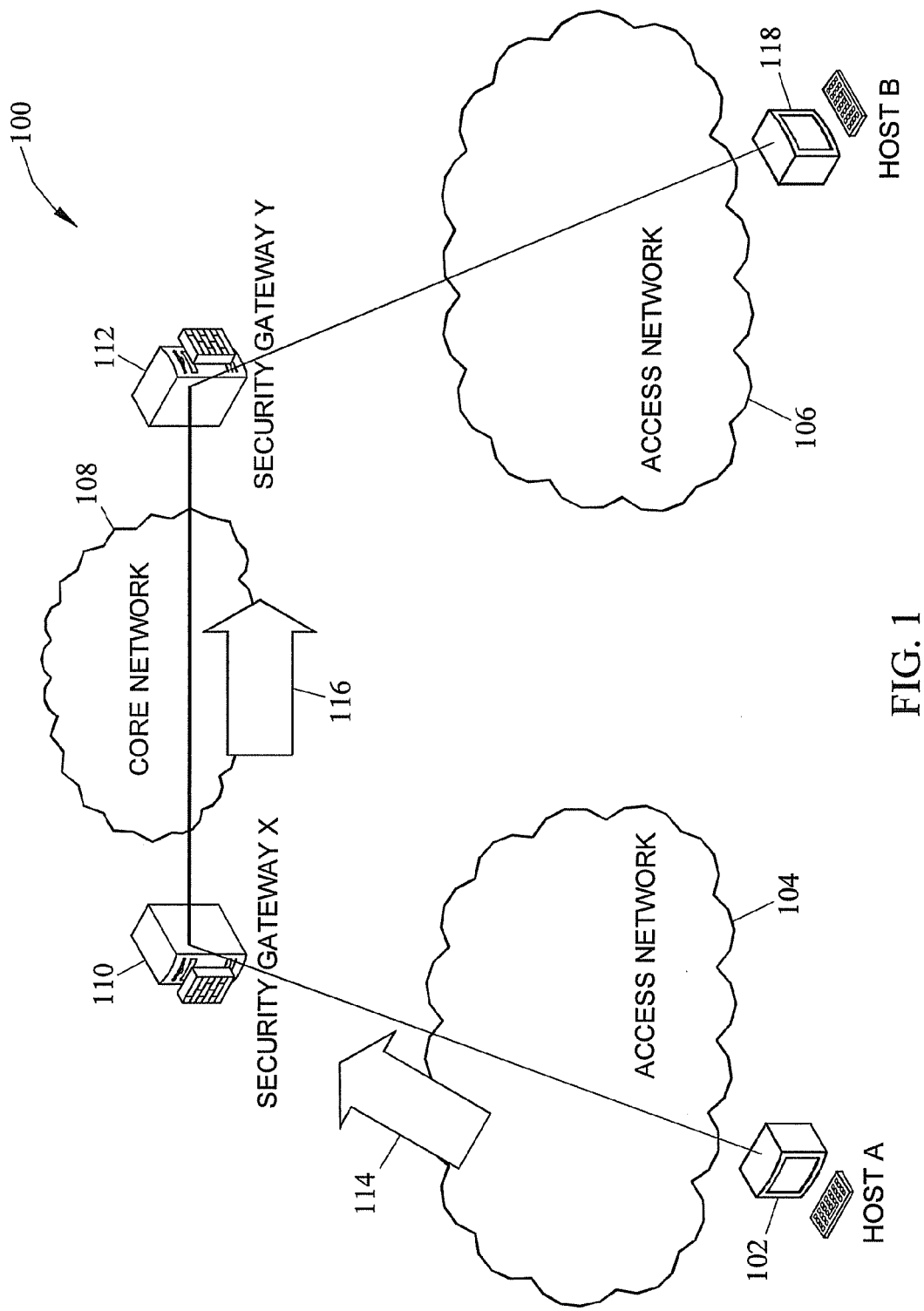
FIG. 1 is a network diagram of an exemplary communications system configuration including a security gateway suitable for performing flow compilation packet processing according to an embodiment of the subject matter described herein.

FIG. 1 is a network diagram of an exemplary network configuration of a system 100 that includes a packet processing security gateway configured to apply a flow compilation process to packets according to an embodiment of the subject matter described herein. Although system 100 only depicts access networks 104 and 106, a core network 108, two security gateways 110 and 112, and hosts 102 and 118, any number or types of networks and network elements may be utilized in system 100 without departing from the scope of the present subject matter.

Referring to FIG. 1, host A 102 (e.g., a sending party) may securely communicate with host B 118 (e.g., a receiving party) via one or more packet-based communications networks. For example, host A 102 may be connected to host B 118 via access networks 104 and 106 and core network 108. In one embodiment, access networks 104 and 106 may route unsecured traffic, while core network 108 may be used to route secure traffic. Security gateways 110 and 112 may be located at the edges of core network 108 for performing various packet processing tasks, such as performing encryption processing for packets entering core network 108. In one embodiment, security gateways 110 and 112 may include any firewall, session border controller, a router, or any other like network element capable of performing some form of packet processing without departing from the scope of the subject matter described herein.

In order to communicate with host B 118, host A 102 may generate and send a packet 114 to security gateway 110 via access network 104. The IP header of packet 114 may include a source IP address associated with host A 102 and a destination IP address associated with host B 118. Upon receiving packet 114, security gateway 110 may conduct a flow compilation packet processing technique if packet 114 is recognized to be associated with a previously processed packet flow. In one embodiment, the packet processing technique may include the steps depicted in FIG. 3 for performing flow compilation (see below). If during this process packet 114 undergoes a packet processing procedure, security gateway 110 may forward processed packet 116 to security gateway 112 via core network 108. Once secure packet is received by security gateway 112, it may be further processed for delivery (if necessary) or simply forwarded to host B 118 using conventional methods.

Figure 2:
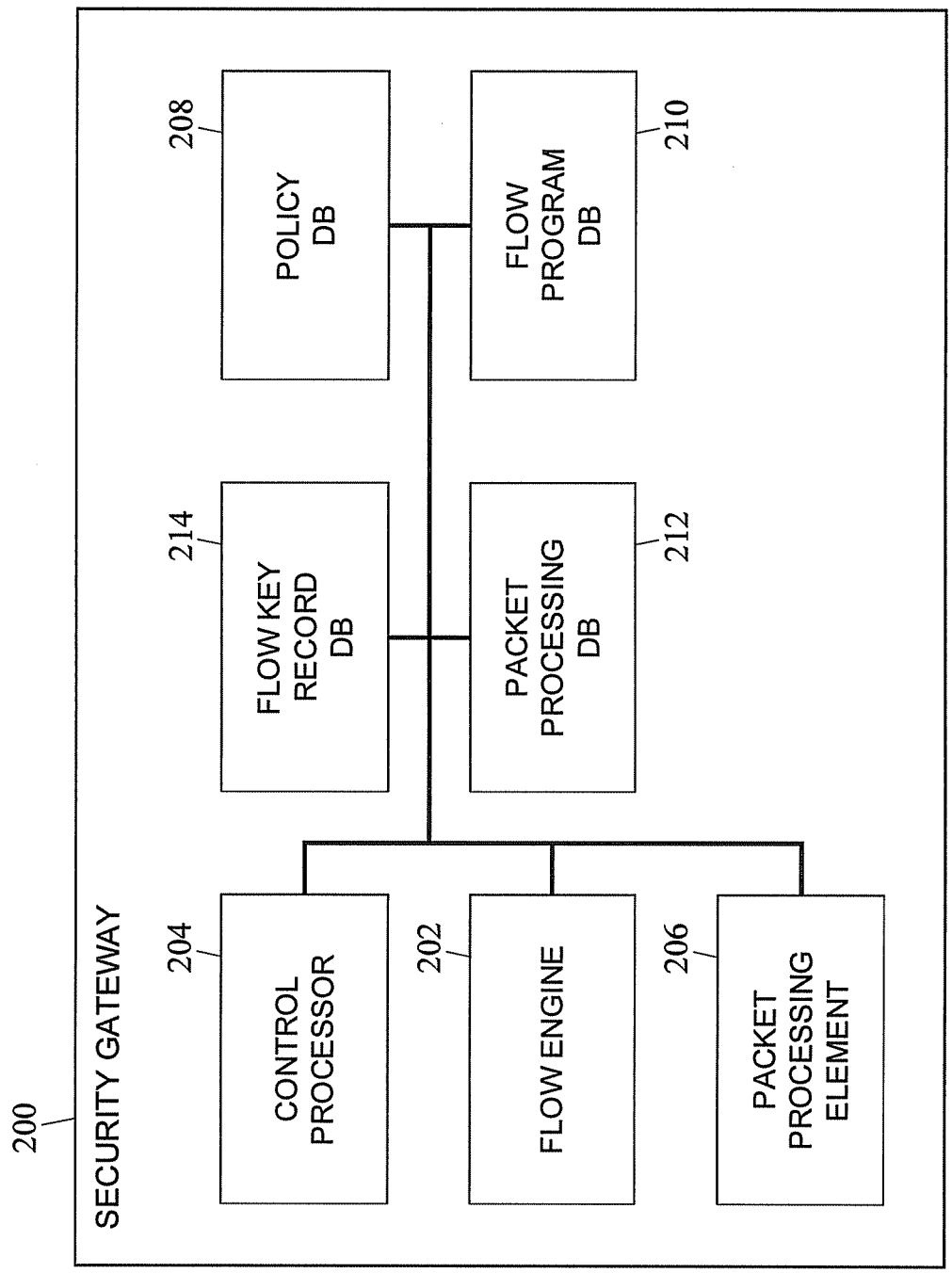
FIG. 2 is a block diagram of an exemplary security gateway suitable for performing flow compilation packet processing according to an embodiment of the subject matter described herein.

FIG. 2 is a block diagram of an exemplary security gateway suitable for performing flow compilation packet processing according to an embodiment of the subject matter described herein. Although the present subject matter is described as being conducted in a security gateway, flow compilation may be performed in any device capable of processing packets. The description of a packet processing security gateway should in no way be interpreted as a limitation of the present subject matter. As used herein, a security gateway refers to a dedicated security appliance located between an unsecured/ open/access network (e.g., access networks 104-106 shown in FIG. 1) and a secure/core network (e.g., core network 108 in FIG. 1) for securing IP communications made to the secure network by performing certain packet processing operations, such as authenticating or encrypting packets of received IP packet data streams. A security gateway may be implemented as hardware, software, firmware, or any combination thereof. Exemplary embodiments of a security gateway may include a firewall, session border controller (SBC), a virtual private network (VPN) function running on an IP router or switch, and the like.

Referring to FIG. 2, security gateway 200 may include a flow engine 202, a control processor 204, and at least one packet processing element 206, and a plurality of databases 208-214. In one embodiment, two or more of databases 208-214 may be combined in a single database. Security gateway 200 may be an exemplary representation of security gateway 110 or security gateway 112, as shown in FIG. 1. In one embodiment, flow engine 202 is configured to receive an incoming packet via a network interface (not shown) and extract header information from the received packet. Flow engine 202 may also be configured to forward the extracted header information to control processor 204 for further processing. In one embodiment, control processor 204 may be configured to utilize the extracted header information to determine if the packet belongs to a packet flow that has been previously processed by security gateway 200. Based on this determination, control processor 204 may either subsequently search entries or record entries in various databases. Control processor 204 may also be configured to send instructions to packet processing element 206 based on its determination and findings. In one embodiment, packet processing element 206 is configured to execute the packet processing instructions received from control processor 204.

In one scenario, a packet is received from a remote host 102 via access network 104 by flow engine 202 (e.g., in security gateway 110). Flow engine 202 may extract (or copy) a predetermined set of packet header data (e.g., an n-tuple) from the received packet and may subsequently forward the extracted data to control processor 204. In one embodiment, flow engine 202 may temporarily store the received packet in a buffer or cache (not shown) while control processor 204 receives and processes the packet header data.

In one embodiment, control processor 204 receives the extracted header data, which may include 5-tuple data comprising a source IP address, a destination IP address, an IP protocol value, a source port number, and a destination port number. Although the processing of 5-tuple data is described in the present specification, any data extracted from the packet may be processed without departing from the scope of the present subject matter. In one embodiment, the source IP address field may include a group of four eight-bit octets for a total of 32 bits. The value for this field is determined by taking the binary value of each octet and concatenating them together to make a single 32-bit value that indicates the sender of the packet. Similarly, the value of the destination IP address field is determined in a manner that is identical to the source IP address field, but instead indicates the receiver of the packet. Moreover, the protocol field may include a protocol number (e.g., an Internet Assigned Numbers Authority protocol number) that defines the protocol used in the data portion of the IP packet.

In one embodiment, control processor 204 is configured to utilize a flow key to classify a packet flow. As used herein, a packet flow or simply a "flow" may include a sequence of packets sent from a particular source to a particular destination. There may be multiple active flows from a source to a destination. Packet flows are typically composed of and identified by packets having identical n-tuple header data that is common to each packet of the same flow. More specifically, an n-tuple is a set of n data values extracted from the protocol headers of a packet. For example, packet headers may contain the 5-tuple data set comprising, a source IP address, a source port number, a destination IP address, destination port number, and IP protocol used. Notably, the 5-tuple flow key may include information from different protocols, with each protocol corresponding to a distinct packet header. For example, the source address and destination address may be obtained from the IP layer while the source port number and destination port number may be obtained from a TCP layer (or a similar layer 4 protocol, such as UDP, ESP, ICMP, etc.). In one embodiment, the IP protocol is an 8-bit number found in the IP header that specifies what protocol is carried within the payload of the IP packet. This is sometimes referred to as the "next" protocol and is considered one level higher than IP in the protocol stack. The protocol numbers are typically codes that serve to represent a particular protocol (e.g., 6 represents TCP, 17 represents UDP, and 1 represents ICMP). In a conventional 5-tuple, the IP source address, IP destination address, and IP protocol may be extracted from the IP header, while the source port and destination port may be extracted from a higher level protocol, as indicated by the IP protocol value in the IP header.

Although layer 3 and layer 4 protocols are described above, the flow key may comprise an n-tuple concatenation including data from any protocol layer without departing from the scope of the present subject matter. Also, although a packet flow is described above in the context of packets, a flow of cells, frames or other datagrams may similarly be processed. Namely, a given flow-based datagram processing system may utilize a plurality of flow classification schemes, to the extent that a flow key used for different types of datagrams may be different. For example, some datagrams may utilize a particular 5-tuple data set, while others may utilize a 3-tuple data set. In addition, some datagrams may use a 5-tuple data set that is different from another 5-tuple data set.

Header information may be used to classify a flow since a packet header provides unique data that may be common in a select group of packets, such as the origin and destination of the packet flow, source and destination ports, and the protocol used to communicate the packet flow. Since a packet flow comprises a group of packets, wherein each packet contains common n-tuple data found in the packet header, packets associated with a commonly derived flow key may be classified as part of the same packet flow.

In one embodiment, a 5-tuple flow key may be abstractly described in terms of concatenation as follows:

[IP source address] [IP destination address] [IP protocol] [source port] [destination port]

where [IP source address] is 32 bits, [IP destination address] is 32 bits, [IP protocol] is 8 bits, [source port] is 16 bits and [destination port] is 16 bits. Thus, this exemplary flow key is represented as a 104-bit flow key and, in one software implementation, may be encoded into a specifically formatted series of bytes. Although a flow key may be generated by a concatenation process, a flow key may be created in any manner without departing from the scope of the present subject matter.

After generating a flow key for the received packet, control processor 204 may compare the generated flow key with entries in flow key record database 214. In one embodiment, flow key record database 214 includes a list of flow keys corresponding to previously received packets. In one embodiment, flow key record database 214 may comprise a set of flow keys that is used as a checklist (e.g., flow key record database 214 may not necessarily provide information if queried). For example, by cross-referencing the recently generated flow key with the previous flow key entries in database 214, control processor 204 is able to determine whether or not the received packet is associated with a previously processed packet or packet flow. More specifically, a flow key is generated for each packet received by security gateway 200. If the received packet is associated with a flow key that cannot be matched with an entry in database 214 (i.e., a similar flow key has not been previously derived by control processor 204), the derived flow key is recorded in flow key record database 214. If the received packet is associated with a derived flow key that matches an entry in flow key record database 214, control processor 204 recognizes that the packet belongs to a previously processed flow (e.g., at least one other previously processed packet associated with the same flow key).

If a match for the flow key is not found in database 214, the flow key is recorded as a new entry in database 214 and the packet is fully processed by security gateway 200. The received packet may then be subjected to one or more services (e.g., packet processing activities) depending on any of a number of classifying conditions the packet satisfies. In one embodiment, packet classification algorithms may be executed (e.g., by control processor 204) for the purpose of recognizing certain characteristics associated with the received packet. For example, the executed algorithms may examine the packet header data and logically correlate at least a portion of the packet header data with entries of at least one policy database 208 to determine that the packet requires a specific type of processing. Although only one packet examination sequence is presently described, other types of packet processing sequences and database searches may be implemented without departing from the scope of the present subject matter. Moreover, policy databases may be accessed and utilized in a variety of ways, such as using hash tables, priority lists, indexed tables, dedicated hardware acceleration, and the like. For example, a hash function may be used to convert a flow key into a hash index, which may then be used to lookup a smaller number of possible entries that may match the original flow key value in a hash table database. In one embodiment, the hash function may utilize a cyclic redundancy check (CRC) algorithm. Notably, the use of a hash function, or any other similar database access algorithms that increase querying efficiency, does not depart from the scope of the present subject matter.

Although only one policy database is depicted in FIG. 2, additional policy databases may be queried by control processor 204 without departing from the scope of the present subject matter. In one embodiment, the entries of policy database 208 include a plurality of packet processing activities. Packet processing activities may include such operations as packet modification, filtering, statistics updating, denial of service prevention, deep packet inspection, the application of security protocols, and the like. By cross-referencing the header data associated with the received packet with the entries of database 208, an appropriate sequence of packet processing activities may be selected.

Once the appropriate processing activities are ascertained from policy database 208, control processor 204 compiles an associated flow program that, when ultimately executed, applies the packet processing activities to the packet. In one embodiment, a flow program may refer to any type of stored instructions that can direct packet processing element 206 to perform a particular packet processing procedure, such as packet filtering or statistics updating. That is, if packet filtering is required, a packet filtering program is compiled for filtering the packet based on one or more parameters of the packet. Alternatively, if statistics updating is required, a packet statistics updating program is compiled for updating statistics related to the packet based on one or more parameters of the packet. In yet another example, if deep packet inspection is required, a deep packet inspection program is compiled for inspecting the packet based on one or more parameters of the packet. Notably, for every packet processing activity required by a packet, a corresponding software program may be compiled to perform the requisite operation based on one or more parameters of the packet. In one embodiment, a series of different activities may be linked together as a series of steps that may be compiled as one software program to perform a plurality of requisite operations. For example, a software program may be compiled to perform security processing (e.g., IPsec), conduct IP routing, and update relevant statistics. In one embodiment, the flow program may be a small program more akin to a subroutine, as opposed to an entire software program.

After compiling the flow program, control processor 204 then stores the compiled version (or a copy) of the flow program in a flow program database 210. In one embodiment, flow program database 210 includes a database configured to contain compiled flow programs that may be applied to subsequently received packets belonging to a common packet flow (e.g., same flow key and/or packet header data as the first received packet of the packet flow). Namely, each of the flow programs contained in flow program database 210 is a compiled program that includes the requisite arguments and instructions pertaining to the application of a packet processing activities to a packet belonging to a packet flow. In one embodiment, flow program database 210 may also be used to test whether a flow key has been seen before, eliminating the need for a separate flow key record database.

As mentioned above, if a matching entry for the recently derived flow key is found by control processor 204 in flow key record database 214 (e.g., the packet flow has been previously processed by control processor 204), control processor 204 then determines that flow program database 210 should be accessed without consulting policy database 208. By using the flow key, control processor 204 accesses database 210 and locates at least one compiled program that has been applied to the previously received packet(s) associated with the common packet flow. Once the appropriate compiled program is located, control processor 204 may generate instructions directing flow engine 202 to forward the received packet to processing element 206. Control processor 204 may also inform processing element 206 to apply the compiled program located in database 214 to the received packet. Once the packet and compiled program instructions are received, processing element 206 executes the compiled program and processes the packet accordingly. Upon completing the flow program processing on the packet, a processed packet is generated and routed back to flow engine 202. When flow engine 202 receives the processed packet, it may forward the packet to a core network element via an exit interface (not shown).

Figure 3:
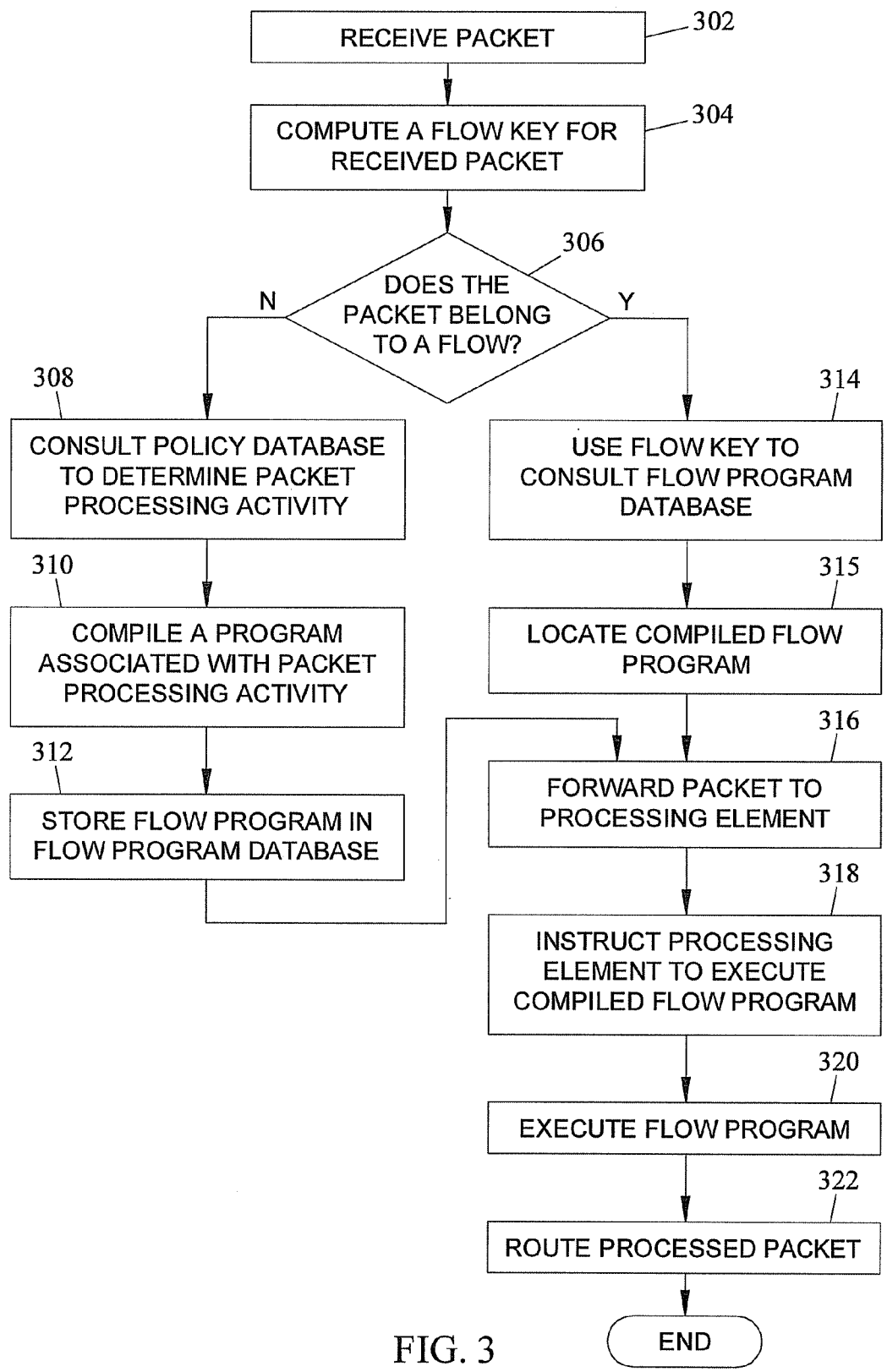
FIG. 3 is a flow chart depicting an exemplary method for performing flow compilation packet processing according to an embodiment of the subject matter described herein.

FIG. 3 is a flow chart of a method 300 for performing flow compilation packet processing according to an embodiment of the subject matter described herein. In one embodiment, method 300 may be embodied as computer executable instructions that are stored on a computer readable medium and may be executed by a processor of a computer, such as a network element (e.g., a security gateway) or other like packet processing device.

Method 300 begins at block 302 where a packet is received. In one embodiment, security gateway 200 receives a packet communicated from host A 102 to host B 108 via core network 104.

In block 304, a flow key is computed for the received packet. In one embodiment, control processor 204 computes a hash value of a flow key using a hash function. For example, a flow key may be created by applying a CRC algorithm (e.g., a CRC32 algorithm) to the concatenation of a 5-tuple data set, which may include the packet header's source IP address, the destination IP address, the source port number, the destination port number, and the IP protocol being used.

In block 306, a determination as to whether the received packet is associated with a packet flow previously processed by security gateway 200 is made. In one embodiment, the derived flow key is cross-referenced with entries in a flow key record database 214. As mentioned above, each entry of flow key record database 214 comprises a flow key associated with a packet that has been previously processed (e.g., the first packet of a packet flow) by security gateway 200. If a matching entry is found, then security gateway 200 has previously processed a packet flow associated with the received packet and may initiate packet processing based on a previously compiled flow by proceeding to block 314. If a matching entry is not found, then the packet must be fully processed by conventional techniques initiated at block 308.

In block 314 (i.e., returning to the scenario where the received packet belongs to a packet flow), the flow key is used to consult one or more flow program databases. In one embodiment, control processor 204 queries flow program database 210 and cross-references the flow key with the entries of flow program database 210. As mentioned above, each entry of flow program database 210 comprises a compiled program that includes the requisite arguments and instructions needed to apply the desired packet processing activities to a packet associated with a given packet flow. Notably, there is no need to query either policy database 208, which specifies the appropriate packet processing activity, or a packet processing database (which would be found on a security gateway configured to perform traditional flow acceleration).

In block 315, a compiled flow program is located. In one embodiment, control processor 204 locates the appropriate compiled flow program as a result of querying flow program database 210 (as described in block 308). Once the compiled program is located, method 300 continues to block 316.

In one embodiment, blocks 306, 314, and 315 may be combined into a single process (or block in FIG. 3). For example, flow key record database 214 and flow program database 210 may be embodied as a single database (e.g., all data stored on flow program database 210) that is accessed once by control processor 204. Specifically, control processor 204 may perform one lookup into this single database and immediately determine if a flow program exists by using the flow key to find a matching entry (i.e., a flow key with an associated flow program). If a flow program is not found, then method 300 may proceed to block 308. If a flow program is found, then method 300 continues to block 316.

In block 308, a policy database is consulted to determine a packet processing activity. In one embodiment, control processor 204 executes at least one algorithm that uses the packet header data to query one or more policy databases 208 to determine one or more appropriate packet processing activities to be applied to the received packet. Packet processing activities may be determined by any of the aforementioned conventional techniques.

In block 310, flow programs associated with the determined packet processing activities are compiled. In one embodiment, control processor 204 compiles a flow program for each of the determined packet processing activities that need to be applied to the received packet. In one embodiment, control processor 204 may compile a single flow program that applies all activities to the packet in an appropriate sequence.

In block 312, flow programs are stored in a flow program database. In one embodiment, control processor 204 stores the compiled flow program(s) (or copies of the compiled flow program(s)) in flow program database 210 which will be used for subsequent received packets belonging to the same flow. In an alternate embodiment, a flow program is stored in a single combined database that may contain information typically stored in both flow key record database 214 and flow program database 210 (e.g., flow program database 210 may be used to store flow key records as well as flow programs). Security gateway 200 may also be configured to temporarily cache the compiled program before being applied to the packet presently being processed (e.g., see block 318 below). In one embodiment, each of the flow programs contained in flow program database 210 is a compiled program that includes the requisite arguments and instructions pertaining to the application of a packet processing activities to a packet belonging to a packet flow. In one embodiment, block 312 may also include the storing of the flow key (generated in step 304) in flow key record database 214 or in the aforementioned "single combined database" that also includes flow program data. Alternatively, a new flow key may be generated and stored (in either database 214 or the single combined database) at this stage in method 300 as well.

In block 316, the packet is forwarded to a processing element. In one embodiment, flow engine 202 forwards the received packet (e.g., previously stored in a buffer) to packet processing element 206.

In block 318, the processing element is instructed to execute the compiled flow program. In one embodiment, control processor 204 sends directions instructing packet processing element 206 to access a specific entry of flow program database 210 in order to execute the appropriate compiled flow program (without having to access a policy database). In one embodiment, control processor 204 provides packet processing element 206 with a recently compiled flow program to execute (e.g., from a temporary buffer or cache) in the event the received packet is a first packet of an unrecognized packet flow.

In block 320, the flow program is executed. In one embodiment, packet processing element 206 executes the appropriate flow program without having to access or search a packet processing database 212 or a policy database 208.

In block 322, the processed packet is routed. In one embodiment, packet processing element 206 forwards the processed packet to flow engine 202, which in turn routes the packet to its intended destination (e.g., as indicated in the packet header data). In an alternate embodiment, the routing function may be performed as part of the flow-based packet processing procedure. Thus, the routing process described above in block 322 may be performed in block 320 as the flow program is executed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing flow compilation packet processing, the method comprising:
   receiving a packet at a packet processing device;
   constructing a flow key for the received packet using at least a portion of packet header data of the received packet;
   comparing the constructed flow key with a plurality of previously constructed flow keys associated with packet flows previously processed at the packet processing device in order to determine if the received packet is associated with one of the packet flows previously processed at the packet processing device;
   if the received packet is determined not be associated with one of the packet flows, querying a policy database to identify a packet processing activity to be applied to the received packet, compiling a flow program that applies the packet processing activity to the packet, and using the flow key to store the compiled flow program in a flow program database in the packet processing device;
   if the received packet is determined to be associated with one of the previously processed packet flows, using the flow key to query the flow program database containing compiled flow programs to locate the compiled flow program previously used to process the one of the previously processed packet flows in a manner that bypasses the use of the policy database and utilizing the located compiled flow program to process the received packet.

2. The method of claim 1 wherein utilizing the flow key includes determining if the flow key of the received packet matches a flow key of the at least one other packet, wherein the flow key of the at least one other packet is an entry in a flow key record database.

3. The method of claim 2 wherein if the packet is determined not to be associated with the at least one other packet previously processed at the packet processing device, determining a program to be applied to the received packet, compiling the program, associating the compiled program with the flow key, storing the flow key and the compiled program in a flow program database.

4. The method of claim 1 wherein constructing the flow key includes concatenating portions of the packet header data.

5. The method of claim 4 wherein the packet header data includes bits stored in an IP source address field, an IP destination address, an IP protocol field, a source port number field, and a destination port number field.

6. A method for performing flow compilation packet processing, the method comprising:
   receiving a packet at a packet processing device;
   constructing a flow key for the received packet using at least a portion of packet header data of the received packet;
   comparing the constructed flow key with a plurality of previously constructed flow keys associated with packet flows previously processed at the packet processing device in order to determine if the received packet is associated with one of the packet flows previously processed at the packet processing device;
   if the received packet is determined not be associated with one of the packet flows, querying a policy database to identify a packet processing activity to be applied to the received packet, compiling a flow program that applies the packet processing activity to the packet, and using the flow key to store the compiled flow program in a flow program database in the packet processing device;
   if the received packet is determined to be associated with one of the previously processed packet flows, using the flow key to query the flow program database containing compiled flow programs to locate the compiled flow program previously used to process the one of the previously processed packet flows in a manner that bypasses the use of the policy database and utilizing the located compiled flow program to process the received packet, wherein a hash function is used to convert the flow key into a hash index to be used to query a hash table database.

7. The method of claim 6 wherein the hash function utilizes a cyclic redundancy check (CRC) algorithm.

8. A method for performing flow compilation packet processing, the method comprising:
receiving a packet at a packet processing device;
constructing a flow key for the received packet using at least a portion of packet header data of the received packet;
comparing the constructed flow key with a plurality of previously constructed flow keys associated with packet flows previously processed at the packet processing device in order to determine if the received packet is associated with one of the packet flows previously processed at the packet processing device;
if the received packet is determined not be associated with one of the packet flows, querying a policy database to identify a packet processing activity to be applied to the received packet, compiling a flow program that applies the packet processing activity to the packet, and using the flow key to store the compiled flow program in a flow program database in the packet processing device;
if the received packet is determined to be associated with one of the previously processed packet flows, using the flow key to query the flow program database containing compiled flow programs to locate the compiled flow program previously used to process the one of the previously processed packet flows in a manner that bypasses the use of the policy database and utilizing the located compiled flow program to process the received packet, wherein querying the flow program database is conducted without accessing a packet processing database.

9. A packet processing device for performing flow compilation packet processing, the packet processing device comprising:
a flow manager module for receiving a packet;
a control processor for:
constructing a flow key for the received packet by using at least a portion of packet header data of the received packet,
comparing the constructed flow key with a plurality of previously constructed flow keys associated with packet flows previously processed at the packet processing device in order to determine if the received packet is associated with one of the packet flows previously processed at the packet processing device,
querying, if the received packet is determined not be associated with one of the packet flows, a policy database to identify a packet processing activity to be applied to the received packet, compiling a flow program that applies the packet processing activity to the packet, and using the flow key to store the compiled flow program in a flow program database in the packet processing device,
using, if the received packet is determined to be associated with the one of the previously processed packet flows, the flow key to query the flow program database containing compiled flow programs to locate the compiled flow program previously used to process the one of the previously processed packet flows in a manner that bypasses the use of the policy database; and
a packet processing unit for utilizing the located compiled flow program to process the received packet.

10. The packet processing device of claim 9 wherein the control processor is further configured to determine if the flow key of the received packet matches a flow key of the at least one other packet, wherein the flow key of the at least one other packet is an entry in a flow key record database.

11. The packet processing device of claim 10 wherein the control processor is further configured to, if the packet is determined not to be associated with the at least one other packet previously processed at the packet processing device, determine a program to be applied to the received packet, compiling the program, associating the compiled program with the flow key, storing the flow key and the compiled program in a flow program database.

12. The packet processing device of claim 9 wherein the control processor is further configured to construct the flow key by concatenating portions of the packet header data.

13. The packet processing device of claim 12 wherein the packet header data includes at least a portion of an IP source address field, an IP destination address, an IP protocol field, a source port number field, and a destination port number field contained in a header of the received packet.

14. A packet processing device for performing flow compilation packet processing, the packet processing device comprising:
a flow manager module for receiving a packet;
a control processor for:
constructing a flow key for the received packet by using at least a portion of packet header data of the received packet,
comparing the constructed flow key with a plurality of previously constructed flow keys associated with packet flows previously processed at the packet processing device in order to determine if the received packet is associated with one of the packet flows previously processed at the packet processing device; and
querying, if the received packet is determined not be associated with one of the packet flows, a policy database to identify a packet processing activity to be applied to the received packet, compiling a flow program that applies the packet processing activity to the packet, and using the flow key to store the compiled flow program in a flow program database in the packet processing device,
using, if the received packet is determined to be associated with the one of the previously processed packet flows, the flow key to query the flow program database containing compiled flow programs to locate the compiled flow program previously used to process the one of the previously processed packet flows in a manner that bypasses the use of the policy database; and
a packet processing unit for utilizing the located compiled flow program to process the received packet, wherein the control processor is further adapted to utilize a hash function to convert the flow key into a hash index to be used to query a hash table database.

15. The packet processing device of claim 14 wherein the hash function utilizes a cyclic redundancy check (CRC) algorithm.

16. A packet processing device for performing flow compilation packet processing, the packet processing device comprising:
a flow manager module for receiving a packet;
a control processor for:
constructing a flow key for the received packet by using at least a portion of packet header data of the received packet, comparing the constructed flow key with a plurality of previously constructed flow keys associated with packet flows previously processed at the packet processing device in order to determine if the received packet is associated with one of the packet flows previously processed at the packet processing device; and querying, if the received packet is determined not be associated with one of the packet flows, a policy database to identify a packet processing activity to be applied to the received packet, compiling a flow program that applies the packet processing activity to the packet, and using the flow key to store the compiled flow program in a flow program database in the packet processing device, using, if the received packet is determined to be associated with the one of the previously processed packet flows, the flow key to query the flow program database containing compiled flow programs to locate the compiled flow program previously used to process the one of the previously processed packet flows in a manner that bypasses the use of the policy database; and a packet processing unit for utilizing the located compiled flow program to process the received packet, wherein the control processor is further configured to query the flow program database without accessing a packet processing database.

* * * * *